W. Onions,
Cotton Bale Tie.

No. 55,353.          Patented June 5, 1866.

Witnesses:          Inventor:

UNITED STATES PATENT OFFICE.

WILLIAM ONIONS, OF ST. LOUIS, MISSOURI.

IMPROVEMENT IN COTTON-BALE TIES.

Specification forming part of Letters Patent No. 55,353, dated June 5, 1866.

*To all whom it may concern:*

Be it known that I, WILLIAM ONIONS, of the city and county of St. Louis, State of Missouri, have invented a new and Improved Cotton-Bale Tie; and I do hereby declare that the following is a full, clear, and exact description thereof, which will enable others skilled in the art to make and use the same, reference being had to the accompanying drawings forming part of this specification.

The present invention relates to a new and useful improvement in ties (so called) for cotton-bales, whereby the unfastening of the tie by the handling of the bale or by the close packing of bales on board of ships, cars, &c., is entirely prevented, as will be obvious from the following detail description thereof, reference being had to the accompanying plate of drawings, in which—

Figure 1:
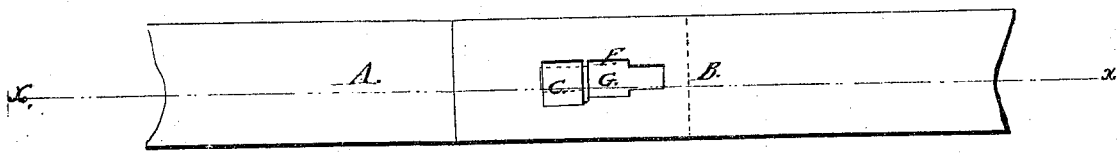
Figure 2:
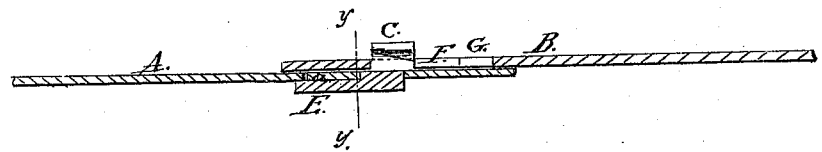

Figure 1 is a view of the flat side of the two ends of a hoop joined or secured together by my improved tie; Fig. 2, a section taken in the plane of the line $x\,x$, Fig. 1; and Fig. 3, a transverse section taken in the plane of the line $y\,y$, Fig. 2.

Similar letters of reference indicate like parts.

A and B in the drawings represent the two ends of a cotton-bale hoop, to one of which is secured a hook or head, C, having a peculiar shape, to be described, passed through the aperture D in the hoop, from the under side thereof, and there held by riveting a stud or pin, $a$, to the hoop of the arm or plate E of the said hook or head C, the hook and plate with its stud or rivet being made in one solid piece, thus imparting great strength and durability to the same.

Figure 3:

The hook portion of the head C is upon one side, as plainly seen by an inspection of Fig. 3 in the drawings, so that when placed in the larger and central portion, F, of the slot G, extending in the direction of the length of the hoop of the other end, B, it will hook over the edges of the smaller or narrow portion of the same by drawing it in the proper direction therefor, as seen in Fig. 1, whereby the tie will be prevented from unfastening by handling or closely packing the bale or bales in ships, cars, &c., as is obvious without further explanation.

I claim as new and desire to secure by Letters Patent—

1. The head C, having the hook upon one side, substantially as and for the purpose described.

2. Forming the head C, plate E, and rivet $a$ of one and the same piece, as and for the purpose specified.

WILLIAM ONIONS.

Witnesses:
 THOS. HAYWARD,
 JOSEPH H. WEBSTER.